United States Patent
He

(10) Patent No.: US 8,840,772 B2
(45) Date of Patent: Sep. 23, 2014

(54) SOLAR FUEL CELL

(75) Inventor: Ting He, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 279 days.

(21) Appl. No.: 12/781,378

(22) Filed: May 17, 2010

(65) Prior Publication Data

US 2011/0278176 A1    Nov. 17, 2011

(51) Int. Cl.

| | |
|---|---|
| *B01J 19/12* | (2006.01) |
| *C25B 3/04* | (2006.01) |
| *C25B 1/00* | (2006.01) |
| *B01J 19/24* | (2006.01) |
| *B01J 35/00* | (2006.01) |
| *B01J 35/06* | (2006.01) |
| *B01J 23/38* | (2006.01) |

(52) U.S. Cl.
CPC .......... *C25B 1/003* (2013.01); *B01J 2219/0892* (2013.01); *B01J 2219/0884* (2013.01); *B01J 35/004* (2013.01); *B01J 19/127* (2013.01); *B01J 19/2475* (2013.01); *B01J 35/065* (2013.01); *B01J 23/38* (2013.01)
USPC .................... 205/340; 204/157.5; 204/157.15

(58) Field of Classification Search
CPC ..... C25B 1/003; B01J 19/127; B01J 19/2475; B01J 2219/0892; B01J 35/004
USPC ............................. 205/340; 204/157.5, 157.15
See application file for complete search history.

(56) References Cited

U.S. PATENT DOCUMENTS

| | | | |
|---|---|---|---|
| 4,011,149 A * | 3/1977 | Nozik ............................ | 205/340 |
| 4,090,933 A * | 5/1978 | Nozik ............................ | 205/340 |
| 4,167,461 A * | 9/1979 | Dickson et al. ............... | 205/340 |
| 4,219,392 A * | 8/1980 | Halmann ....................... | 205/340 |
| 4,240,882 A | 12/1980 | Ang et al. | |
| 4,259,418 A | 3/1981 | Clark et al. | |
| 4,389,290 A * | 6/1983 | Gratzel et al. ................. | 205/340 |
| 4,414,080 A * | 11/1983 | Williams et al. .............. | 205/340 |
| 4,437,954 A | 3/1984 | Sammells et al. | |
| 4,460,443 A | 7/1984 | Somorjai et al. | |
| 4,478,699 A * | 10/1984 | Halmann et al. .......... | 204/157.87 |
| 4,523,981 A | 6/1985 | Ang et al. | |
| 4,545,872 A * | 10/1985 | Sammells et al. ............ | 205/340 |
| 4,595,465 A * | 6/1986 | Ang et al. ..................... | 205/340 |
| 4,609,451 A | 9/1986 | Sammells et al. | |

(Continued)

FOREIGN PATENT DOCUMENTS

| | | | |
|---|---|---|---|
| DE | 3246070 A | * | 6/1984 |
| JP | 8-290052 A | | 11/1996 |
| WO | 2005/063363 A1 | | 7/2005 |

OTHER PUBLICATIONS

Chemistry: Science of Change, Oxtoby et al, Saunders College Publishing, 1990, p. I-15.*

(Continued)

*Primary Examiner* — Keith Hendricks
*Assistant Examiner* — Colleen M Raphael
(74) *Attorney, Agent, or Firm* — Capitol City TechLaw, PLLC; Mark E. Duell

(57) ABSTRACT

The present teachings are directed to a method of converting water and a carbon-containing compound, such as $CO_2$, into a hydrocarbon through a process of absorbing sunlight on a light-absorbing component to photoelectrochemically oxidize water and reacting the products from that water oxidation reaction over a catalyst with the carbon-containing compound to produce the desired hydrocarbon compound.

8 Claims, 1 Drawing Sheet

(56) References Cited

U.S. PATENT DOCUMENTS

| | | | |
|---|---|---|---|
| 4,620,906 A | 11/1986 | Ang | |
| 5,022,970 A | 6/1991 | Cook et al. | |
| 6,541,697 B1 | 4/2003 | Georg et al. | |
| 6,913,735 B2 | 7/2005 | Imasaki et al. | |
| 7,241,950 B2 * | 7/2007 | Fan et al. | 136/252 |
| 8,105,474 B2 * | 1/2012 | Fan | 205/340 |
| 2005/0005963 A1 | 1/2005 | Fan | |
| 2008/0213641 A1 * | 9/2008 | Ostermann et al. | 204/242 |
| 2008/0245672 A1 * | 10/2008 | Little et al. | 205/555 |
| 2009/0061267 A1 * | 3/2009 | Monzyk et al. | 204/660 |
| 2009/0101516 A1 | 4/2009 | Suib et al. | |
| 2009/0127124 A1 * | 5/2009 | Guerra | 205/340 |
| 2010/0000874 A1 * | 1/2010 | Hinman et al. | 205/340 |
| 2010/0133110 A1 * | 6/2010 | Nocera et al. | 205/340 |
| 2013/0098772 A1 * | 4/2013 | Bocarsly et al. | 205/340 |

OTHER PUBLICATIONS

Barton et al, "Selective Solar-Driven Reduction of CO2 to Methanol Using a Catalyzed p-GaP Based Photoelectrochemical Cell," J. Am. Chem. Soc. 2008, vol. 130, pp. 6342-6444 (published on Web Apr. 26, 2008).*

Kaneco et al, "Photoelectrochemical reduction of carbon dioxide at p-type gallium arsenide and p-type indium phosphide electrodes in methanol," Chem. Eng'g. J. vol. 116 (2006) pp. 227-231.*

Ampelli et al, "Synthesis of solar fuels by a novel photoelectrocatalytic approach," Energy Environ. Sci. 2010, vol. 3, pp. 292-301.*

Centi et al, "Electrocatalytic conversion of CO2 to long carbon-chain hydrocarbons," Green Chemistry 2007, vol. 9, pp. 671-678.*

International Search Report dated Aug. 2, 2011 for corresponding PCT application PCT/US2011/034458 filed on Apr. 29, 2011 (3 pages).

Varghese, O.K., Paulose, M., LaTempa, T.J., and Grimes, C.A., "High-Rate Solar Photocatlaytic Conversion of CO2 and Water Vapor to Hydrocarbon Fuels," Nano Letters, Jan. 27, 2009, vol. 9, No. 2, pp. 731-737, ACS, Washington, DC.

* cited by examiner

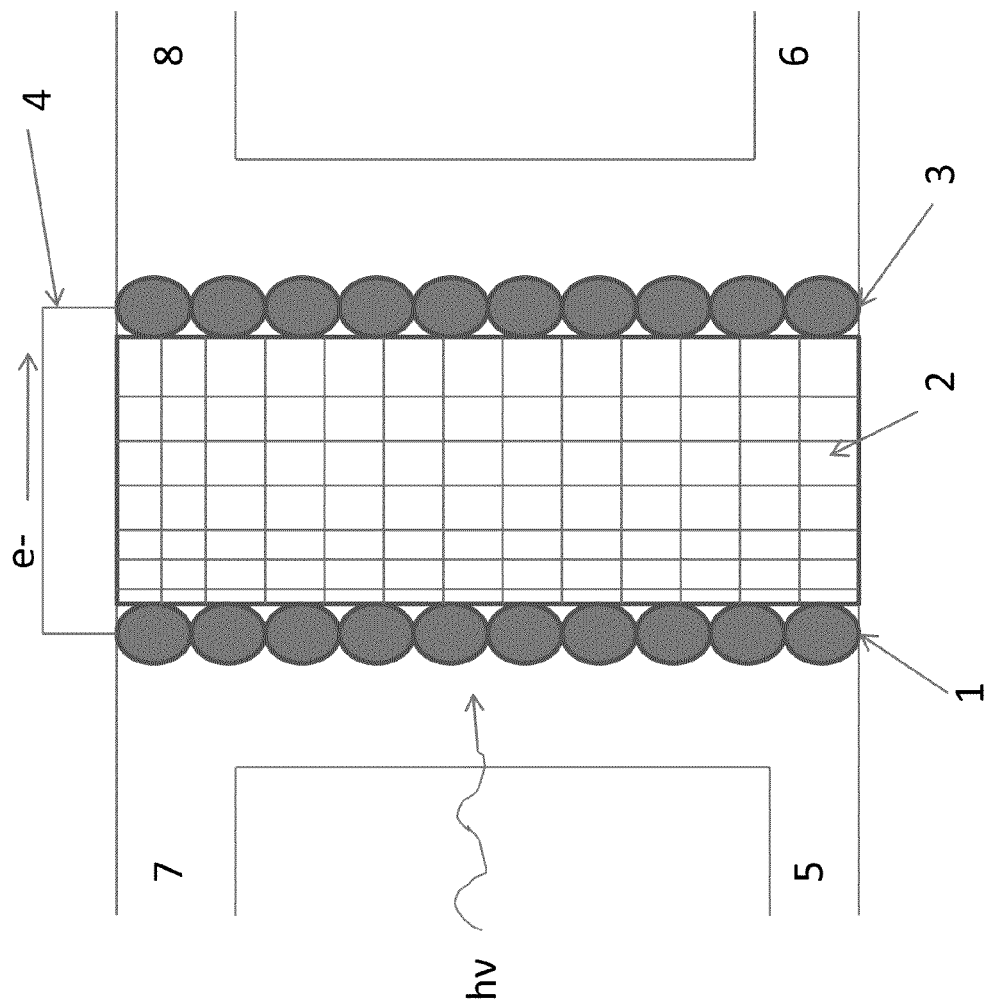

SOLAR FUEL CELL

BACKGROUND

1. Field of the Invention

The present teachings relate to a method of converting water and a carbon-containing compound into a hydrocarbon through a process of absorbing sunlight on a light-absorbing component to photoelectrochemically oxidize water and reacting the products from that water oxidation reaction over a catalyst with a carbon-containing compound, such as $CO_2$, to produce a hydrocarbon compound.

2. Discussion of the Related Art

Photosynthesis is a kinetically slow process for the production of hydrocarbons from $CO_2$ and water using solar radiation as an energy source to drive the conversion reaction.

The well-known Fischer-Tropsch synthesis process of producing hydrocarbons from CO and water requires high temperatures and pressures, even in the presence of a catalyst, to produce hydrocarbons.

Several techniques are known to facilitate the oxidative decomposition of water into hydrogen and oxygen gases. The decomposition of water reaction is not thermodynamically favorable at standard temperature and pressure. The general reactions occurring in a standard water electrolysis cell are:

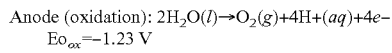

Anode (oxidation): $2H_2O(l) \rightarrow O_2(g) + 4H+(aq) + 4e-$
$Eo_{ox} = -1.23$ V

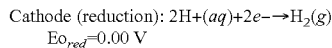

Cathode (reduction): $2H+(aq) + 2e- \rightarrow H_2(g)$
$Eo_{red} = 0.00$ V

Thus, the standard potential of a water electrolysis cell is $-1.23$ V at 25° C.

A process to produce hydrocarbons from water and a source of carbon-containing compounds at non-elevated temperatures and pressures with sunlight as the energy source in a kinetically fast manner is of great interest. Additionally, a device to carry out the process is desirable.

SUMMARY OF THE PRESENT DISCLOSURE

The present teachings are directed to a method for converting a carbon-containing component and water to a hydrocarbon component by providing a light-harvesting, charge-separating and transporting component, a proton-conducting membrane, and a catalyst component. There is an electrical connection between the light-harvesting, charge-separating and transporting component and the catalyst component. The light-harvesting, charge-separating and transporting component can be exposed to radiation of a sufficient wavelength to produce separated electron and hole pairs, and water can be contacted with the electron and hole pairs to produce oxygen gas, protons, and electrons. The oxygen gas is removed. The electrons are transported through the electrical connection from the light-harvesting, charge-separating and transporting component to the catalyst component, and the protons are conducted across the proton-conducting membrane to contact the catalyst component. The carbon-containing component is contacted with the catalyst component, the protons, and the electrons to produce the desired hydrocarbon component, which is then removed.

The present teachings also teach a device for using solar radiation to convert water and a carbon-containing component to a hydrocarbon component. The device includes a light-harvesting, charge-separating and transporting component having a first surface in contact with water and exposed to a radiation source, and a second surface in contact with a first surface of a proton-conducting membrane. The proton-conducting membrane has a first surface in contact with the second surface of the light-absorbing, charge-separating and transporting component and a second surface in contact with a first surface of a catalyst component. The catalyst component has a first surface in contact with the second surface of the proton-conducting membrane and a second surface in contact with a source of a carbon-containing component. There is an electrical connection between the light-harvesting, charge-separating and transporting component and the catalyst component.

BRIEF DESCRIPTION OF THE DRAWING

The accompanying drawing is included to provide a further understanding of the present disclosure and is incorporated in and constitute a part of this specification, illustrate various embodiments of the present disclosure and together with the detailed description serve to explain the principles of the present disclosure. In the drawing:

FIG. 1 is a general schematic of the presently disclosed device.

DETAILED DESCRIPTION

The present disclosure is directed to a process for converting a carbon-containing component and water to a hydrocarbon component by first providing a light-harvesting, charge-separating and transporting component, a proton-conducting membrane, and a catalyst component. An electrical connection between the light-harvesting, charge-separating and transporting component and the catalyst component is also provided. The light-harvesting, charge-separating and transporting component is exposed to radiation of a sufficient wavelength to produce separated electron and hole pairs.

Water is contacted with the electron and hole pairs to produce, via oxidation, oxygen gas, protons, and electrons. The oxygen gas is removed from the process, while the electrons are transported through the electrical connection from the light-harvesting, charge-separating and transporting component to the catalyst component, and the protons are conducted across the proton-conducting membrane to contact the catalyst component.

At the catalyst component, the presently disclosed method continues, with a carbon-containing component contacting with the catalyst component, the protons, and the electrons to produce a hydrocarbon component. This newly produced hydrocarbon component is then removed from the process.

To function in the disclosed process, the light-harvesting, charge-separating and transporting component can be a semiconductor-based formulation with a band gap of at least 1.23V to drive the water oxidation reaction. The component generates the needed electron and hole pairs when irradiated with sunlight. The light-harvesting, charge-separating and transporting component can be a p-type semiconductor material selected from the group consisting of p-SiC, p-GaP, p-InP, and p-GaAs, or in other embodiments it can be an n-type semiconductor material selected from the group consisting of n-TiO2, n-WO3, n-SiC, n-SrTiO3, n-CdS, n-GaP and n-GaAs.

Also suitable for use in the present process as the light-harvesting, charge-separating and transporting component are organic materials that generate electron and hole pairs when irradiated with sunlight, more specifically, the organic material should have a band gap of at least 1.23 V.

The proton-conducting membrane used in the present process can be a ceramic-based membrane or a polymer-based membrane, or in other embodiments, the proton-conducting membrane can be a membrane such as a Nafion-based or hydrocarbon-based membrane.

Suitable catalyst components include formulations containing a precious metal, base metal or chalcogenide catalyst formulation. For instance, the catalyst component can include at least one metal selected from the group consisting of Fe, Co, Ni, Cu, Zn, Ru, Rh, Pd, Ag, Re, Os, Ir, Pt, Au, Pb, S, Se and Te. In some embodiments of the present process, the catalyst component can be selected from a hydrogenation catalyst formulation, a hydrogenolysis catalyst formulation, or a reduction catalyst formulation.

The carbon-containing component added as a reactant to the present process can be at least one member selected from the group consisting of carbon monoxide and carbon dioxide. According to various other embodiments of the present process, the carbon-containing component can include, in some instances, compounds that contain at least one carbon-oxygen bond.

The hydrocarbon component produced by the present process can include alcohols, aldehydes, alkanes, alkenes and alkynes. The exact composition of the produced hydrocarbon component will depend on reaction conditions, catalyst component, and the initial carbon-containing component. One of skill in the art will be able to select the parameters set forth above in order to produce their desired hydrocarbon component.

Ideally, in the process disclosed herein, the radiation of a sufficient wavelength will be sunlight. In other embodiments of the present process, different sources of radiation, such as lasers, or concentrated sunlight, can be utilized. Radiation sources that do not use decrease the overall energy efficiency of the presently disclosed process are preferred.

A device for using solar radiation to convert water and a carbon-containing component to a hydrocarbon component is also taught by the present disclosure. One embodiment of the presently disclosed device can include a light-harvesting, charge-separating and transporting component having a first surface in contact with water and exposed to a radiation source, and a second surface in contact with a first surface of a proton-conducting membrane. The proton-conducting membrane can have a first surface in contact with the second surface of the light-absorbing, charge-separating and transporting component and a second surface in contact with a first surface of a catalyst component. The catalyst component can have a first surface in contact with the second surface of the proton-conducting membrane and a second surface in contact with a source of a carbon-containing component. The presently disclosed device can also have an electrical connection between the light-harvesting, charge-separating and transporting component and the catalyst component.

In the presently disclosed device, electron and hole pairs are produced by the absorption of radiation of a sufficient wavelength to cause the oxidation of water at the first surface of the light-absorbing, charge-separating and transporting component to produce oxygen, protons, and electrons.

An electrical connection is provided between the light-harvesting, charge-separating and transporting component and the catalyst component in embodiments of the presently disclosed device to permit transport of the electrons.

Additionally, the device provides for the protons to be conducted across the proton-conducting membrane from the light-harvesting, charge-separating and transporting component to the catalyst component. At the second surface of the catalyst component the carbon-containing component is contacted with the protons and the electrons to produce the hydrocarbon component.

FIG. 1 is a general schematic of one embodiment of the presently disclosed device with a light-absorbing, charge separating and transporting component 1 having one side in contact with a proton-conducting membrane 2. The proton-conducting membrane 2 transports protons from component 1 to the catalyst component 3. There is also an electrical connection 4 between component 1 and catalyst 3 to provide a pathway for electrons to move from component 1 to catalyst 3. The embodiment represented in FIG. 1 also has inlets for water 5 and the carbon-containing component 6, respectively, here in this instance at opposite sides on the bottom of the device. The pictured embodiment also features outlets for the products of the disclosed process, oxygen 7 and a hydrocarbon component 8, respectively, at the top of the device.

In this embodiment of the present device, the light-absorbing, charge separating and transporting component 1 can be a semiconductor material having a band gap of at least about 1.23 V, that is, sufficiently high to drive the water oxidation reaction at its surface.

According to our present theory, but without being limited thereto, upon absorbing a photon of sunlight, the component 1 creates electron ($e^-$) and hole ($h^+$) pairs which can then be used to oxidize water to produce $O_2$ gas, protons ($H^+$) and electrons. The basic reaction is believed to be as follows:

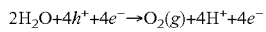
$$2H_2O + 4h^+ + 4e^- \rightarrow O_2(g) + 4H^+ + 4e^-$$

The component 1 can be, for instance, a semiconductor-based formulation which can harvest the photon and generate the desired $e^-/h^+$ pair. In other embodiments of the presently disclosed device, the component 1 can incorporate organic dye molecules, or other compounds with the needed levels of conjugation, to provide band gaps of sufficient energy to drive the reaction.

The proton-conducting membrane 2 can be provided in various suitable structural configurations in relation to both component 1 and catalyst 3 so long as the membrane 2 is capable of conducting the protons produced by the oxidation of water from component 1 to catalyst 2.

Further to the present theory, but without being limited thereto, at the catalyst 3, the carbon-containing component is reacted with the protons and electrons to produce the desired hydrocarbon component. The basic reaction is believed to be as follows:

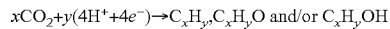
$$xCO_2 + y(4H^+ + 4e^-) \rightarrow C_xH_y, C_xH_yO \text{ and/or } C_xH_yOH$$

The carbon-containing component can contain both carbon and oxygen and can be, for example, carbon monoxide and/or carbon dioxide. The hydrocarbon component produced by the present process can include alcohols, aldehydes, alkanes, alkenes and alkynes. The reaction conditions, catalyst component, and the initial carbon-containing component will influence the final structure of the hydrocarbon component.

All publications, articles, papers, patents, patent publications, and other references cited herein are hereby incorporated by reference herein in their entireties for all purposes.

Although the foregoing description is directed to the preferred embodiments of the present teachings, it is noted that other variations and modifications will be apparent to those skilled in the art, and which may be made without departing from the spirit or scope of the present teachings.

The foregoing detailed description of the various embodiments of the present teachings has been provided for the purposes of illustration and description. It is not intended to be exhaustive or to limit the present teachings to the precise embodiments disclosed. Many modifications and variations will be apparent to practitioners skilled in this art. The

What we claim is:

1. A method for converting a carbon-containing component and water to a hydrocarbon moiety-containing component comprising:
   exposing a light-harvesting, charge-separating and transporting component to sunlight to produce separated electron and hole pairs;
   contacting the water with the electron and hole pairs to produce oxygen gas, protons, and electrons;
   removing the oxygen gas;
   transporting the electrons through an electrical connection from the light-harvesting, charge-separating and transporting component directly to a catalyst component;
   conducting the protons across a proton-conducting membrane and the catalyst component prior to contacting the carbon-containing component;
   contacting a carbon-containing component with the catalyst component, the protons, and the electrons to produce a hydrocarbon moiety-containing component; and
   removing the hydrocarbon moiety-containing component,
   wherein the light-harvesting, charge-separating and transporting component comprises p-type semiconductor material selected from the group consisting of p-SiC, p-GaP, p-InP, and p-GaAs.

2. The method according to claim 1, wherein the light-harvesting, charge-separating and transporting component comprises a semiconductor-based formulation.

3. The method according to claim 1, wherein the light-harvesting, charge-separating and transporting component comprises a material with a band gap of at least 1.23V.

4. The method according to claim 1, wherein the proton-conducting membrane comprises a ceramic-based membrane or a polymer-based membrane.

5. The method according to claim 1, wherein the catalyst component comprises a precious metal, base metal or chalcogenide containing formulation.

6. The method according to claim 1, wherein the catalyst component comprises a hydrogenation catalyst formulation, a hydrogenolysis catalyst formulation, or a reduction catalyst formulation.

7. The method according to claim 1, wherein the carbon-containing component comprises at least one member selected from the group consisting of carbon monoxide and carbon dioxide.

8. The method according to claim 1, wherein the hydrocarbon moiety-containing component comprises at least one member selected from the group consisting of an alcohol, an aldehyde, an alkane, an alkene and an alkyne.

* * * * *